United States Patent [19]

Toyama

[11] 4,399,553

[45] Aug. 16, 1983

[54] CHARACTER READER

[75] Inventor: Akira Toyama, Shimosuwa, Japan

[73] Assignee: Kabushiki Kaisha Sankyo Seiki Seisakusho, Nagano, Japan

[21] Appl. No.: 221,107

[22] Filed: Dec. 29, 1980

[30] Foreign Application Priority Data

Dec. 29, 1979 [JP] Japan .................. 54-181958[U]
Jan. 21, 1980 [JP] Japan ...................... 55-5444

[51] Int. Cl.³ .............................................. G06K 9/18
[52] U.S. Cl. .......................................... 382/7; 382/29; 382/64
[58] Field of Search ................. 340/146.3 C; 235/449, 235/450; 360/2, 32, 40, 48, 88, 131, 137; 382/7, 29, 64

[56] References Cited

U.S. PATENT DOCUMENTS

| | | | |
|---|---|---|---|
| 3,168,720 | 2/1965 | Eckert | 340/146.3 C |
| 3,281,787 | 10/1966 | Trimble | 340/146.3 C |
| 3,482,211 | 12/1969 | De Claris et al. | 382/29 |
| 3,528,058 | 9/1970 | Bond | 340/146.3 C |
| 3,535,682 | 10/1970 | Dykaar et al. | 340/146.3 C |
| 3,629,829 | 12/1971 | Ordower | 340/146.3 C |
| 3,638,238 | 1/1972 | Milford et al. | 340/146.3 C |
| 3,851,309 | 11/1974 | Kenney et al. | 340/146.3 C |
| 4,143,356 | 3/1979 | Nally | 340/146.3 C |
| 4,148,010 | 4/1979 | Shiau | 340/146.3 C |

*Primary Examiner*—Leo H. Boudreau
*Attorney, Agent, or Firm*—Sughrue, Mion, Zinn, Macpeak & Seas

[57] ABSTRACT

A character reader recognition data extracting device for use in an optical character reader system for reading characters printed in magnetized ink. Characters printed in magnetized ink on a substrate are magnetized with a magnetic polarity opposite that of stray magnetic particles which may adhere to a conveying roll for the substrate. Signals produced at the output of the magnetic head due to the presence of the stray particles are discriminated from those produced in response to the characters due to the differences in magnetic polarity. A processing circuit is disclosed which operates upon the output signal from the magnetic head to provide digital signals representative of the sensed characters. This circuit includes a sample-and-hold circuit, an offset circuit and comparators which compare the output of the sample-and-hold circuit shifted by the offset circuit with the unshifted signal at a prior sampling period.

18 Claims, 17 Drawing Figures

|  | A1 | A2 | A3 | A4 | A5 | A6 | A7 | A8 |
|---|---|---|---|---|---|---|---|---|
| INCREMENT DIRECTION | — | 1 | 1 | 1 | 1 | 1 | 1 | 1 |
| DECREMENT DIRECTION | — | 1 | 1 | — | 1 | 1 | 1 | 1 |

FIG. 7B

|  | A1 | A2 | A3 | A4 | A5 | A6 | A7 | A8 |
|---|---|---|---|---|---|---|---|---|
| INCREMENT DIRECTION | — | 0 | 1 | 0 | 0 | 0 | 0 | 0 |
| DECREMENT DIRECTION | — | 0 | 0 | — | 1 | 0 | 0 | 0 |

FIG. 8

CHARACTER READER

BACKGROUND OF THE INVENTION

The present invention relates to a recognition data extracting device for use with an optical character reader (hereinafter abbreviated to "OCR" when applicable) in which light is applied to characters printed by a typewriter or a printer or hand-written characters and the characters are recognized by utilizing light reflected therefrom or for use with a magnetic ink character reader (hereinafter abbreviated to "MICR" when applicable) in which character recognition is carried out by reading with a magnetic head characters which are printed in special patterns with ink containing magnetic material.

Figure 1:
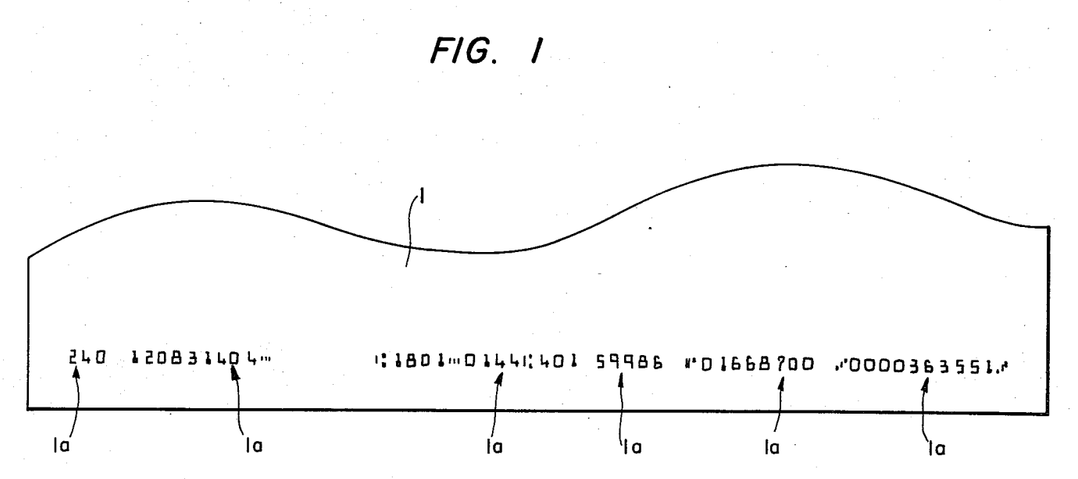
FIG. 1 is a diagram showing a commonly-employed character font for magnetic characters used with the invention.

Magnetic ink character readers have been employed in facilities such as banks to read data from and classify checks, bills, and the like. An example of magnetic ink characters which are used with an MICR is the CMC7 character font which is employed as the standard character font in various countries in Europe. On the other hand, the E13B character font as shown in FIG. 1 is employed in both America and Japan.

Conventional magnetic ink character readers can be classified into two groups. In one of the two groups, a matrix pattern system is employed in which magnetic heads of several tens of channels are provided to digitize characters. In the other groups, an analog pattern system is employed in which a single channel magnetic head is provided to convert characters into an analog waveform. Examples of a magnetizing device and a magnetic head for the analog pattern system are as shown in FIG. 2.

However, the magnetic ink character reader of the matrix pattern system is disadvantageous in that, as a number of channels are employed, the circuit is intricate in arrangement. Moreover, if characters are not correctly positioned with respect to the magnetic heads, errors due to tracking shift, etc. can arise which reduces the reliability of character recognition.

On the other hand, the magnetic ink character reader of the analog pattern system is advantageous in that such errors due to tracking shift, etc. can be prevented. However, it is still disadvantageous in that, as character recognition is carried out in an analog mode, the recognition circuit is necessarily intricate in arrangement and the output signal of the magnetic head is unstable, tending to cause errors, with the result that the reliability of character recognition is again somewhat low.

Figure 2:
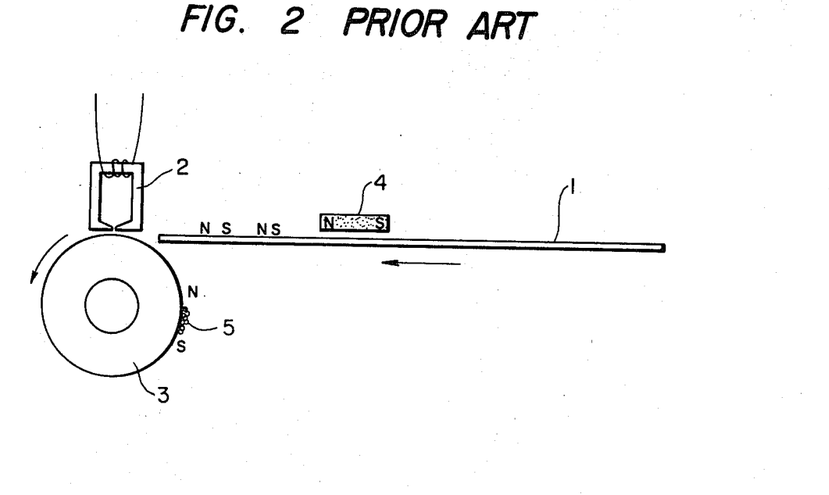
FIG. 2 is a cross-sectional view of a magnetic ink character reader of the prior art.

Referring to FIG. 2, a pad roller 3, made of non-magnetic material, is adapted to press a card 1 against a magnetic head 2. If stray magnetic ink particles 5 magnetized by a magnet 4 are stuck to the pad roller 3, then variations in magnetic flux are produced which are detected by the magnetic head 2 when the magnetic ink particles 5 pass the magnetic head 2 as the pad roller 3 is turned in the direction of the arrow. The detection of the particles produces an erroneous output as a character signal or signals. This erroneous detection is liable to occur especially when a blank portion of the card 1 where no characters 1a, 1a, ..., 1a (FIG. 1) are printed passes through the magnetic head 2. This type of optical character reader thus suffers from the same difficulties as the magnetic ink characteristic reader.

SUMMARY OF THE INVENTION

In view of the foregoing, an object of the invention is to provide a character recognition data extracting device which has a simple circuit arrangement and high character recognition reliability.

The foregoing object and other objects of the invention have been achieved by providing a recognition data extracting device in which stray magnetic ink particles stuck to a pad roller are magnetized so that the magnetic polarity of the magnetic ink particles on the pad roller is opposite to the magnetic polarity of characters which are printed on a card in magnetic ink and in order to distinguish an output signal provided in response to the magnetic ink particles on the pad roller from an output signal provided in response to characters provided on the card. An analog signal generated in response to a character on a card is divided at a plurality of sampling points to provide a plurality of output values which are subjected to comparison wherein each output value is compared with its preceding output value to digitize each character.

DESCRIPTION OF THE PREFERRED EMBODIMENTS

The invention will be described with reference to the accompanying drawings in detail.

In FIG. 1, reference character 1 designates a card, and 1a, 1a, 1a, ... and 1a E13B characters. These E13B characters printed on the card 1 are read by a recognition data extracting device shown in FIGS. 3 and 4.

Figure 3:
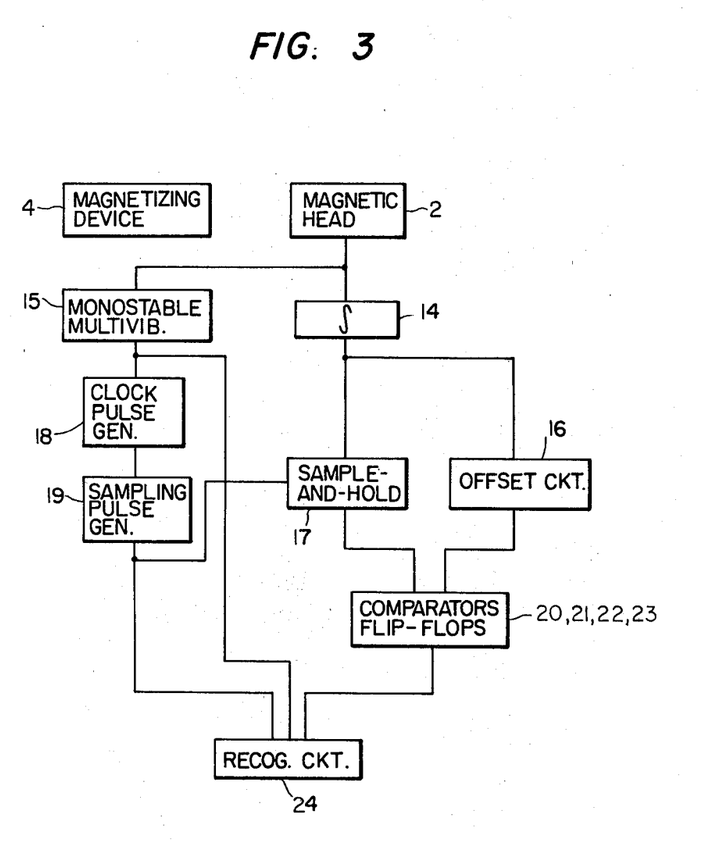
FIG. 3 is a block diagram of a character reader of the invention.
Figure 4:
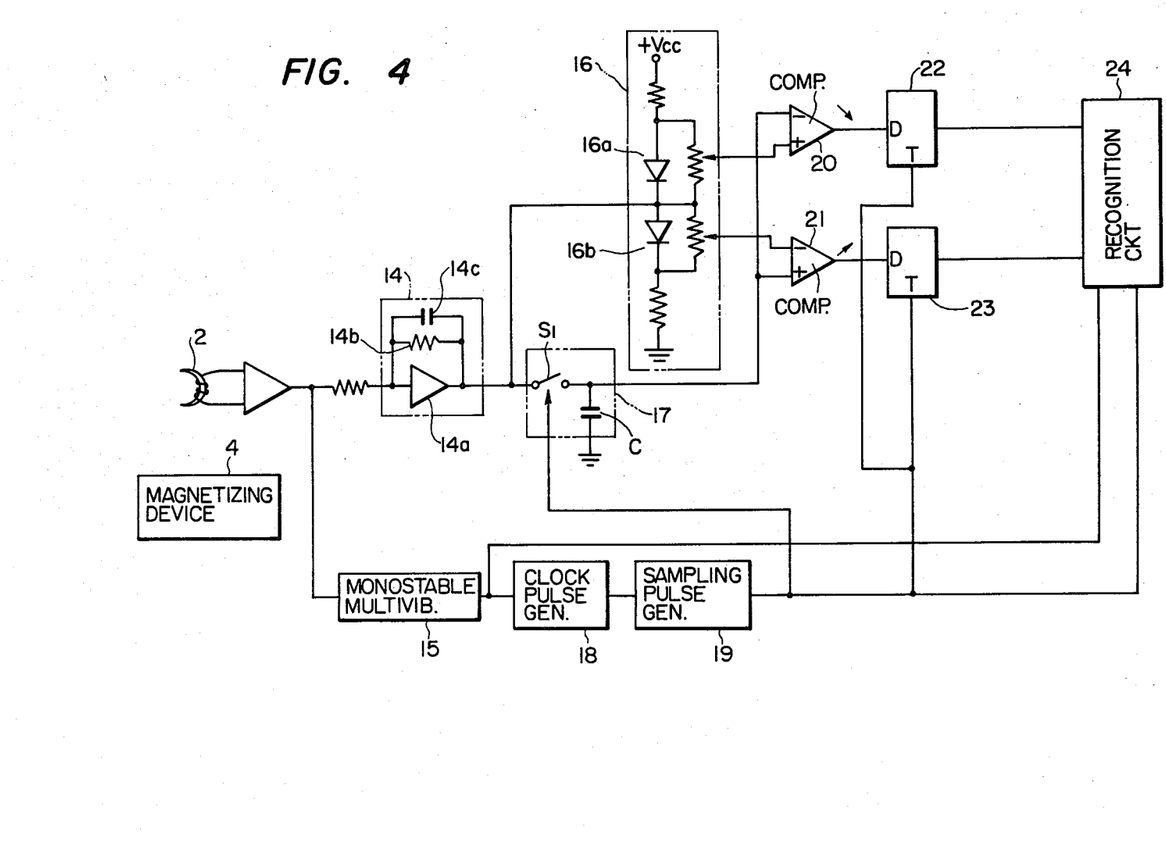
FIG. 4 is a schematic diagram of the character reader of FIG. 3.
Figure 5:
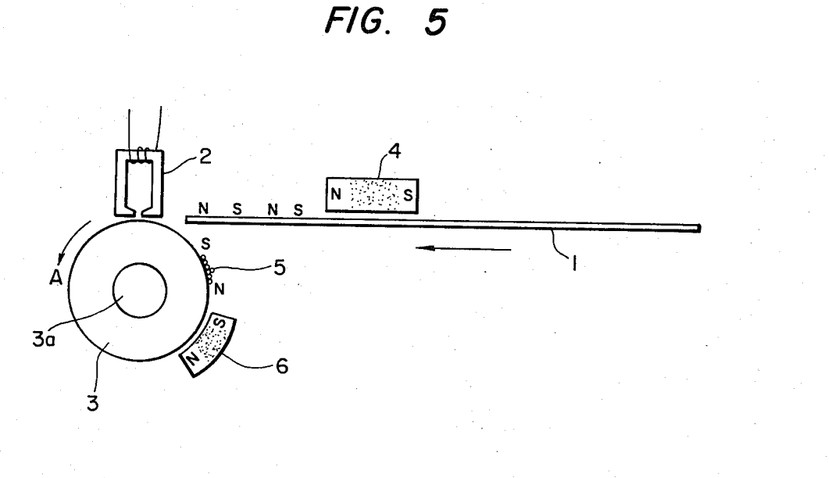
FIG. 5 is a cross-sectional view showing a magnetic head and conveying structure of the invention.

Referring to FIGS. 3 and 4, reference character 2 designates a magnetic head for detecting the magnetic flux variations produced by magnetized E13B characters, 4 a device for magnetizing E13B characters. The magnetic head 2 and the magnetizing device 4 according to the invention are shown in FIG. 5. The characters printed in magnetic ink are magnetized all with the same polarity by the magnetizing device 4, which may be an electromagnet or a permanent magnet, before passing between the magnetic head 2 and a pad roller 3. The pad roller 3 can be turned in the direction of the arrow A by the force of the card 1 passing between the magnetic head 2 and the pad roller 3 or it can be turned in the same direction by a rotary shaft 3a which is driven by a driving source (not shown). A magnetizing device 6 is disposed near the cylindrical wall of the pad roller 3 so that the magnetic ink particles 5 on the pad roller 3 are magnetized to have a polarity which is opposite to that of the characters on the card.

As the card 1 is run along the magnetic head 2, the magnetic flux variations produced by the characters 1a ... 1a are detected by the magnetic head 2 as a result of which the magnetic head 2 outputs analog signals.

Figure 6A:
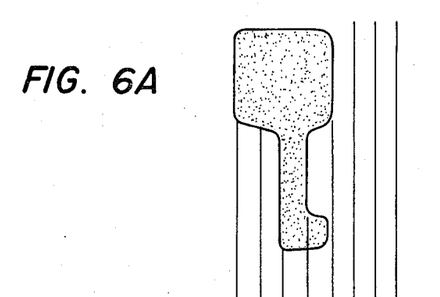
FIGS. 6A–6I are waveform diagrams utilized in an explanation of the invention.
Figure 6B:
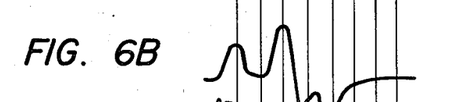
Figure 6C:
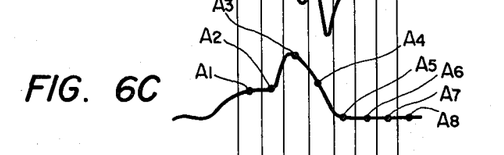

The case where the magnetic head 2 reads the pattern of an E13B character corresponding to a digit "1" will be described by way of example. FIG. 6A shows the pattern of an E13B character corresponding to the digit "1". When the magnetic head 2 reads the pattern of the E13B character, the magnetic head 2 outputs an analog signal as shown in FIG. 6B. On the other hand, the output of the magnetic head 2 which is produced in response to magnetic flux variations due to magnetic ink particles stuck to the pad roller 3 in FIG. 5 is as shown in FIG. 6H. That is, the output is a signal which rises from a side opposite to the side from which the output shown in FIG. 6B rises.

The analog signal shown in FIG. 6B is applied to an integrator circuit 14 and a monostable multivibrator 15. The integrator circuit 14, as shown in FIG. 4, is made up of an operational amplifier 14a, a feedback resistor 14b and a feedback capacitor 14c. The integrator circuit 14 integrates the analog signals shown in FIGS. 6B and 6H to output analog signals which are shown in FIGS. 6C and 6I, respectively. The analog signals thus outputted are applied to an offset circuit 16 and a sample-and-hold circuit 17. As is apparent from FIGS. 6C and 6I, the integrator circuit output produced when the character is read is clearly different in polarity from that produced when the magnetic ink particles 5 are read. Thus, these two outputs can be clearly distinguished from each other. Accordingly, in the case where output signals as shown in FIGS. 6C and 6I are provided, erroneous detections due to the presence of stray magnetic ink particles 5 can be prevented by inhibiting the use of the negative polarity output signal as the character signal.

The offset circuit 16 and the sample-and-hold circuit 17 will be described below.

Figure 6D:
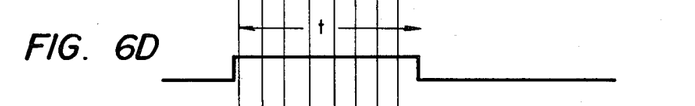
Figure 6E:
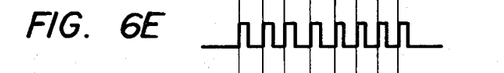

When the analog signal shown in FIG. 6B is applied to the monostable multivibrator 15, the multivibrator 15 outputs a pulse having a predetermined pulse width of time t as shown in FIG. 6D. The pulse thus outputted is applied to a clock pulse generator 18 which in turn outputs clock pulses as shown in FIG. 6E during the pulse time t. The clock pulses are applied to a sampling pulse generator 19.

Figure 6F:
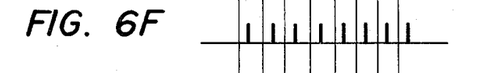

The sampling pulse generator 19 provides a sampling pulse whenever the clock pulse shown in FIG. 6E falls. The sampling pulses thus provided are as shown in FIG. 6F. The sampling pulses are supplied to the sample-and-hold circuit 17.

The sample-and-hold circuit 17, as shown in FIG. 4, includes a switch $S_1$ and a capacitor C. The switch $S_1$ is closed momentarily upon receipt of each sampling pulse. Accordingly, in the sample-and-hold circuit 17, the voltages of the analog signal indicated at points $A_1$ through $A_8$ in FIG. 6C are held by the capacitor C.

The output of the sample-and-hold circuit 17 is connected to the negative input terminal of a first comparator 20 and to the positive input terminal of a second comparator 21. The positive input terminal of the comparator 20 is connected to the upper correction output of the offset circuit 16 and the negative input terminal of the comparator 20 is connected to the lower correction output of the offset circuit 16.

The offset circuit 16 is constructed such that, when the potential variation of the analog signal shown in FIG. 6C is small, the potential variation is disregarded, that is, the potential variation is not regarded as an actual signal representative of characters.

With the voltage of a DC source Vcc applied across the offset circuit 16, the offset circuit 16 divides the potential of the analog signal shown in FIG. 6C into a high potential and a low potential. The high potential is applied to the positive input terminal of the comparator 20 at all times because the terminal is connected to the upper correction output 16a of the offset circuit 16 and the low potential is applied to the negative input terminal of the comparator 20 at all times because the terminal is connected to the lower correction output 16b.

When the potential at the positive input terminal of the comparator 20 is lower than that at the negative input terminal, an output signal corresponding to a binary digit "1" is applied to a D-type flip-flop circuit 22. When the potential at the negative input terminal of the comparator 21 is higher than that at the positive input terminal, an output signal corresponding to a binary digit "1" is applied to a D-type flip-flop circuit 23.

Potentials corresponding to the sampling points $A_1$ through $A_8$ are applied to the positive input terminal of the comparator 20 while potentials one sampling point before the aforementioned potentials extracted at the sampling points $A_1$ through $A_8$, namely sampled-and-held potentials, are applied to the negative input terminal of the comparator 20. Accordingly, adjacent ones of the outputs corresponding to the sampling points $A_1$ through $A_8$ are continuously subjected to comparison by the comparator 20. The operation of the comparator 21 is similar to the above-described operation of the comparator 20.

As the comparator 20 is so designed that it outputs a signal corresponding to a binary digit "1" when a potential subjected to upper correction is lower than a sampled-and-held potential, the comparator 20 detects whether or not the analog signal shown in FIG. 6C is decreasing. On the other hand, because the comparator 21 outputs a signal corresponding to a binary digit "1" when a potential subjected to lower correction is larger than a sampled-and-held potential, the comparator 21 detects whether or not the analog signal shown in FIG. 6C is increasing.

Figure 8:
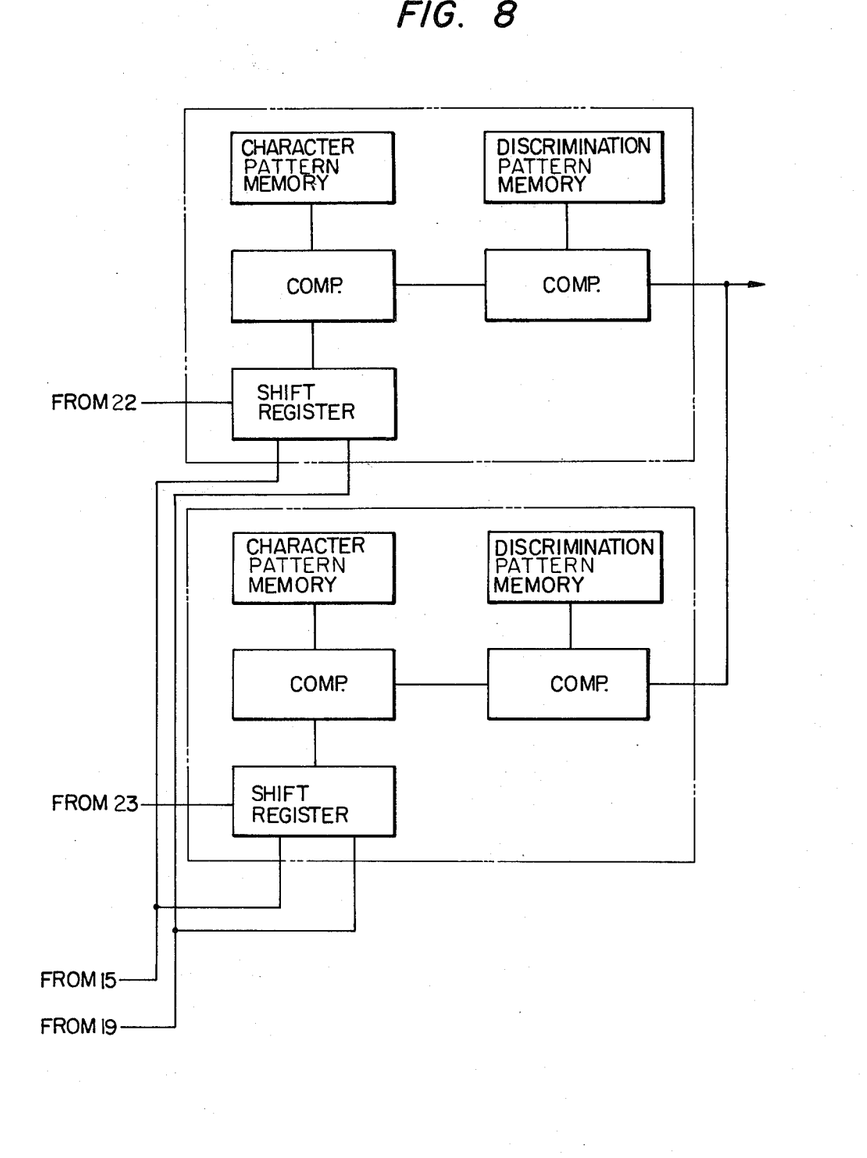
FIG. 8 is a detailed block diagram of the recognition circuit of FIGS. 3 and 4.

The D-type flip-flop circuits 22 and 23 provide output signals corresponding to their input signals whenever triggered by the sampling pulse. The output signals thus provided are applied to a recognition circuit 24. Thus, the output signals of the comparators 20 and 21 are applied as binary digits "0" or "1" to the recognition circuit 24 through the D-type flip-flops 22 and 23. The arrangement of the recognition circuit 24 is shown in FIG. 8 in detail.

Figure 6G:
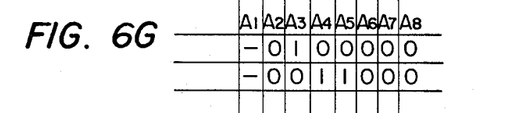
Figure 6H:
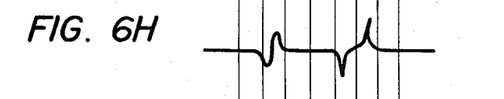
Figure 6I:
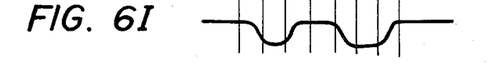
Figure 7A:
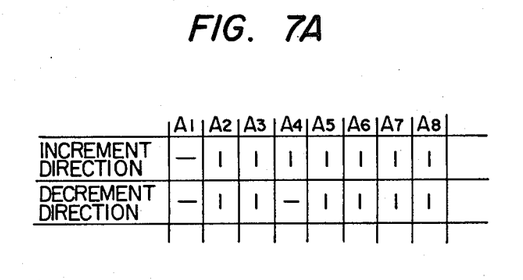
FIGS. 7A and 7B show, respectively, discrimination and character patterns utilized with the recognition circuit shown in FIGS. 3 and 4.

When the recognition circuit 24 reads the pattern of an E13B character as shown in FIG. 6A, recognition data as shown in FIG. 6G is applied to the recognition circuit 24, with the upper line of data in FIG. 6G corresponding to the output of flip-flop 23 and the lower line of data corresponding to the output of flip-flop 22. In the recognition data, at the first sampling point $A_1$, no data is provided for both the increment and decrement directions because no output to be compared is provided at the first sampling point $A_1$. Discrimination patterns for characters to be recognized, for discriminating "effective" (FIG. 7A) and "ineffective" (FIG.

Figure 7B:
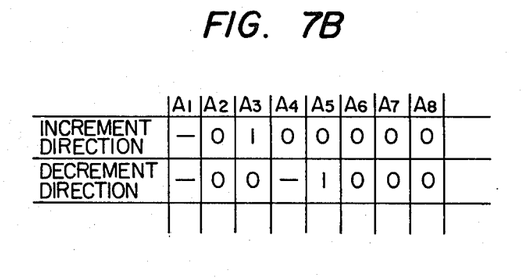

7B) character patterns, are stored in the recognition circuit 24. When the pattern of a character is digitized, the character includes portions in which it is not known whether the bits are "0" or "1". In order to recognize such portions, the discrimination patterns are provided.

By combining recognition data provided by the recognition data extracting device with a discrimination pattern, a digit corresponding to the character configuration which has been read by the magnetic head 2 can be identified. For instance, it is assumed that recognition data as shown in FIG. 6G is present. In this case, the recognition data is combined with the discrimination pattern so that the recognition data and the data of the discrimination pattern are subjected to AND operations. As a result, data as shown in FIG. 7B is produced. When the resultant data coincides with a character pattern corresponding to the digit "1", it is recognized that a digit "1" has been read. Other characters can be read in the same manner.

The invention has been described with reference to the case where the E13B font characters are read, although it should be noted that the CMC7 font characters also can be read merely by changing the number of sampling points.

Furthermore, while the invention has been described with reference to a character recognition data extracting device which is used in a magnetic ink character reader, the recognition data extracting device of the invention is applicable to an optical character reader by using an optical head instead of a magnetic head. In this case, analog signals outputted by the optical head are already integrated analog signals and accordingly it is unnecessary to provide an integrator circuit.

As is apparent from the above description, according to the invention, a magnetizing device is provided which magnetizes the magnetic ink particles on the pad roller so as to have an opposite polarity to that of the magnetized characters in order to prevent erroneous detection. Furthermore, according to the invention, characters are read as analog signals distinguished in polarity. These analog signals are converted into digital signals to recognize the characters. Therefore, the character reader provided according to the invention has a considerably high character recognition reliability.

In addition, the character reader according to the invention is so designed that a character is vertically divided into segments from which signals are provided in an analog mode. Therefore, the character reader has an advantage that detection errors attributed to tracking shift are eliminated.

Moreover, according to the invention, the recognition data is obtained with the data in the increment direction being distinguished from that in the decrement direction which further improves the reliability of character recognition.

What is claimed is:

1. A character reader for reading a character pattern printed on a supporting means, said reader including reading means for generating an output signal in response to said character pattern and means for transporting said supporting means past said reading means, said character reader further comprising:
integrating means for receiving and integrating said output signal to provide an integrated signal;
sampling means for sampling said integrated signal at a plurality of successive sampling times separated by sampling intervals to produce a plurality of signal samples;
means for deriving a comparison signal from said integrated signal during each sampling interval;
comparison means for comparing said comparison signal derived from said integrated signal during each sampling interval with one of said signal samples taken at a sampling time prior to said each sampling interval; and
recognition means for recognizing said character pattern in accordance with the output of said comparison means.

2. The character reader as claimed in claim 1, wherein said means for deriving a comparison signal comprises offset circuit means for providing a first signal higher than said integrated signal and a second signal lower than said integrated signal, and said comparison means comprises a first comparator for comparing said first signal to said one signal sample and a second comparator for simultaneously comparing said second signal to said one signal sample, the outputs of said first and second comparators comprising the output of said comparison means.

3. The character reader as claimed in claim 1, wherein each sampling interval commences with a start sample time and terminates with an end sample time, and said comparison means compares said comparison signal derived from said integrated signal during each sampling interval with the signal sample taken at the start sample time corresponding to the interval during which the compared comparison signal was derived.

4. A character reader for reading characters printed in magnetic ink on a support, said character reader further comprising:
means for magnetizing said characters;
a magnetic head for detecting variations in magnetic flux produced by said characters;
means for transporting said support past said magnetic head;
means for integrating an output signal from said magnetic head to produce an analog signal;
means for sampling said analog signal at a plurality of successive sampling times separated by sampling intervals to produce a plurality of successive output values;
means for deriving a comparison signal from said analog signal during each sampling interval;
comparison means for comparing said comparison signal derived from said output signal during each sampling interval with one of said signal samples taken at a sampling time prior to said sampling interval; and
recognition means for recognizing said character pattern in accordance with the output of said comparison means.

5. The character as claimed in claim 4 in which said conveying means comprises:
a non-magnetic pad roller confronting said magnetic head; and wherein said magnetizing means comprises:
first magnetizing means for magnetizing said characters printed on said support; and
second magnetizing means for magnetizing magnetic particles stuck to said non-magnetic pad roller with a polarity opposite to the polarity of magnetized characters.

6. The character reader as claimed in claim 5 in which said second magnetizing means comprises a magnet disposed in confrontation with said pad roller.

7. The character reader as claimed in claim 5 wherein said sampling means comprises a sample-and-hold circuit and means for generating sampling pulses coupled to operate said sample-and-hold circuit at a rate corresponding to a predetermined number of divisions of each of said characters into linear parts.

8. The character reader as claimed in claim 5 further comprising recognition circuit means operating in response to an output of said comparing means.

9. The character reader as claimed in claim 5 wherein said comparing means comprises first and second comparators and further comprising means for producing said signal produced in response to said analog signal comprising means for varying the level of said analog signal upward and downward.

10. A character reader comprising:
means for magnetizing characters which are printed on a support in magnetic ink;
a magnetic head for detecting variations in magnetic flux produced by said characters;
means for transporting said support past said magnetic head;
first magnetizing means for magnetizing said characters printed on said support,
second magnetizing means for magnetizing magnetic particles on a portion of said transporting means confronting said support with a polarity opposite to the polarity of said magnetized characters; and
means coupled to an output of said magnetic head for producing digital output signals representative of characters read from said support free of variations caused by the presence of said magnetic particles.

11. The character reader as claimed in claim 10 wherein said output signal producing means comprises integrating means and means for comparing an output of said integrating means with a value of said output of said integrating means at a predetermined earlier time.

12. A character reader comprising:
means for magnetizing characters which are printed on a support in magnetic ink;
a magnetic head for detecting variations in magnetic flux produced by said characters;
means for transporting said support past said magnetic head;
integrating means coupled to an output of said magnetic head to produce an analog signal;
sample-and-hold means having a signal input coupled to receive said analog signal;
monostable multivibrator means coupled to said output of said magnetic head;
clock pulse generator means having an input coupled to an output of said monostable multivibrator means for producing a pulse train when said output of said monostable multivibrator is in a state representing the presence of a signal on said output of said magnetic head corresponding to the presence at said magnetic head of a magnetized character;
sampling pulse generator means having an input coupled to an output of said clock pulse generator means for producing sampling pulses coupled to operate said sample-and-hold means at a predetermined edge transition of output pulses from said clock pulse generator;
offset circuit means comprising a first resistor having a first terminal coupled to a positive voltage source, a first diode having an anode terminal coupled to a second terminal of said first resistor, a second diode having an anode terminal coupled to the cathode terminal of said first diode, a second resistor having a first terminal coupled to the cathode terminal of said second diode and a second terminal coupled to ground, a first potentiometer having a first end contact coupled to said second terminal of said first resistor and a second end contact coupled to said cathode terminal of said first diode, a second potentiometer having a first end contact coupled to said second end contact of said first potentiometer and a second end contact coupled to said cathode terminal of said second diode, said analog signal being coupled to said cathode terminal of said first diode;
first and second comparator means, said first comparator means having a positive input coupled to a wiper contact of said potentiometer and a negative input coupled to an output of said sample-and-hold means and said second comparator means having a negative input coupled to a wiper contact of said second potentiometer and a positive input coupled to said output of said sample-and-hold means;
first and second flip-flop means, said first flip-flop means having a data input coupled to an output of said comparator means and said second flip-flop means having a data input control to an output of said second comparator means and said first and second flip-flop means having clock inputs coupled to said output of said sampling pulse generator means; and
character recognition circuit means for producing signals indicative of recognized characters, said character recognition circuit means operating in response to outputs of said flip-flop means.

13. A character reader comprising:
optical reading head means for producing an output analog signal in response to character patterns printed on supporting means;
means for transporting said support past said optical reading head means;
sample-and-hold means having a signal input coupled to receive said analog signal;
monostable multivibrator means having a signal input coupled to receive said analog signal;
clock pulse generator means having an input coupled to an output of said monostable multivibrator means for producing a pulse train when said output of said monostable multivibrator is in a state representing the presence of an output analog signal from said optical reading head means corresponding to the presence at said head means of a character pattern;
sampling pulse generator means having an input coupled to an output of said clock pulse generator means for producing sampling pulses coupled to operate said sample-and-hold means at a predetermined edge transition of output pulses from said clock pulse generator;
offset circuit means comprising a first resistor having a first terminal coupled to a positive voltage source, a first diode having an anode terminal coupled to a second terminal of said first resistor, a second diode having an anode terminal coupled to the cathode terminal of said first diode, a second resistor having a first terminal coupled to the cathode terminal of said second diode and a second terminal coupled to ground, a first potentiometer having a first end contact coupled to said second terminal of said first resistor and a second end contact coupled to said cathode terminal of said first diode, a second potentiometer having a first end contact coupled to said second end contact of said first potentiometer and a second end contact coupled to said cathode terminal of said second diode, said analog signal being coupled to said cathode terminal of said first diode;

first and second comparator means, said first comparator means having a positive input coupled to a wiper contact of said potentiometer and a negative input coupled to an output of said sample-and-hold means and said second comparator means having a negative input coupled to a wiper contact of said second potentiometer and a positive input coupled to said output of said sample-and-hold means;

first and second flip-flop means, said first flip-flop means having a data input coupled to an output of said comparator means and said second flip-flop means having a data input coupled to an output of said second comparator means and said first and second flip-flop means having clock inputs coupled to said output of said sampling pulse generator means; and character recognition circuit means for producing signals indicative of recognized characters, said character recognition circuit means operating in response to outputs of said flip-flop means.

14. A character reader comprising:

first magnetizing means for magnetizing characters which are printed on a support in magnetic ink;

a magnetic head for detecting variations in magnetic flux produced by said characters;

conveying means, including a non-magnetic pad roller confronting said magnetic head, for transporting said support past said magnetic head;

second magnetizing means for magnetizing magnetic particles stuck to said non-magnetic pad roller with a polarity opposite to the polarity of magnetized characters;

means for integrating an output signal from said magnetic head to produce an analog signal;

means for sampling said analog signal at a plurality of sampling points to provide a plurality of successive output values; and means for comparing a signal produced in response to said analog signal with said successive output values wherein each output value is compared with said signal produced in response to said analog signal substantially one sampling point after said output value.

15. The character reader as claimed in claim 14 in which said second magnetizing means comprises a magnet disposed in confrontation with said pad roller.

16. The character reader as claimed in claim 14 wherein said sampling means comprises a sample-and-hold circuit and means for generating sampling pulses coupled to operate said sample-and-hold circuit at a rate corresponding to a predetermined number of divisions of each of said characters into linear parts.

17. The character reader as claimed in claim 14 further comprising recognition circuit means operating in response to an output of said comparing means.

18. The character reader as claimed in claim 14 wherein said comparing means comprises first and second comparators and further comprising means for producing said signal produced in response to said analog signal comprising means for varying the level of said analog signal upward and downward.

* * * * *